United States Patent
Religa et al.

(10) Patent No.: US 12,153,893 B2
(45) Date of Patent: Nov. 26, 2024

(54) AUTOMATIC TONE DETECTION AND SUGGESTION

(71) Applicant: Microsoft Technology Licensing, LLC, Redmond, WA (US)

(72) Inventors: Tomasz Lukasz Religa, Seattle, WA (US); Zhang Li, Bellevue, WA (US); Christine Lauren Mayer, Seattle, WA (US); Max Wang, Seattle, WA (US); Huitian Jiao, Redmond, WA (US); Weixin Cai, Kirkland, WA (US); Cheng Yang, Bellevue, WA (US); Christie Chan, Los Angeles, CA (US); Siqing Chen, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 221 days.

(21) Appl. No.: 17/583,909

(22) Filed: Jan. 25, 2022

(65) Prior Publication Data
US 2023/0259713 A1    Aug. 17, 2023

(51) Int. Cl.
*G06F 40/35* (2020.01)
*G06F 40/253* (2020.01)
*G06F 40/284* (2020.01)
*G06N 20/00* (2019.01)

(52) U.S. Cl.
CPC ............ *G06F 40/35* (2020.01); *G06F 40/253* (2020.01); *G06F 40/284* (2020.01); *G06N 20/00* (2019.01)

(58) Field of Classification Search
CPC ........ G06F 40/35; G06F 40/253; G06N 20/00
See application file for complete search history.

(56) References Cited

U.S. PATENT DOCUMENTS

| | | | |
|---|---|---|---|
| 10,558,758 B2 | 2/2020 | Mehrotra | |
| 10,949,619 B1 | 3/2021 | Arsanjani et al. | |
| 11,194,958 B2 | 12/2021 | Maneriker | |
| 11,755,636 B2 | 9/2023 | Oberoi | |
| 2012/0245934 A1 | 9/2012 | Talwar et al. | |

(Continued)

OTHER PUBLICATIONS

"Rewrite in Word—Say it another way!", Retrieved from: https://web.archive.org/web/20200509072724/https://blog-insider.office.com/2019/08/12/rewrite-in-word-say-it-another-way/, Aug. 12, 2019, 4 Pages.

(Continued)

*Primary Examiner* — Ibrahim Siddo
(74) *Attorney, Agent, or Firm* — NovoTechIP International PLLC

(57) ABSTRACT

A method and system for providing tone detection for a content may include receiving a request to detect a tone for a content, retrieving user data and data about the content, detecting a content environment for the content based on at least one of the user data and the data about the content, detecting the tone for the content based on the content and the content environment, inputting the content and the detected tone into a machine-learning (ML) model for modifying the tone from the detected tone to a modified tone, obtaining at least one rephrased content segment as an output from the ML model, the rephrased content segment modifying the tone of the content from the detected tone to the modified tone, and providing at least one of the detected tone or the at least one rephrased content segment for display.

19 Claims, 11 Drawing Sheets

(56) References Cited

U.S. PATENT DOCUMENTS

| | | | |
|---|---|---|---|
| 2017/0185591 A1* | 6/2017 | Tetreault | G06F 40/56 |
| 2018/0267950 A1 | 9/2018 | De Mello Brandao | |
| 2018/0278561 A1 | 9/2018 | Carnevale et al. | |
| 2019/0121842 A1 | 4/2019 | Catalano et al. | |
| 2020/0053035 A1 | 2/2020 | Mukherjee et al. | |
| 2020/0065381 A1 | 2/2020 | Chui et al. | |
| 2020/0265184 A1 | 8/2020 | Kargiannakis | |
| 2020/0327189 A1 | 10/2020 | Li et al. | |
| 2021/0264109 A1 | 8/2021 | Srinivasan et al. | |
| 2021/0397793 A1* | 12/2021 | Li | G06F 40/166 |
| 2022/0121879 A1 | 4/2022 | Goyal | |
| 2023/0259713 A1 | 8/2023 | Lukasz | |
| 2024/0061999 A1 | 2/2024 | Religa | |

OTHER PUBLICATIONS

"Final Office Action Issued in U.S. Appl. No. 16/904,037", Mailed Date: Oct. 22, 2021, 11 Pages.

"Non Final Office Action Issued In U.S. Appl. No. 16/904,037", Mailed Date: Jun. 28, 2021, 9 Pages.

Fu, et al., "Style Transfer in Text: Exploration and Evaluation", In Repository of arXiv:1711.06861v2, Nov. 27, 2017, 9 Pages.

Lambert, Joan, "Microsoft Word 2019 Step by Step", In Publication of Microsoft Press, Feb. 4, 2019, 24 Pages.

"International Search Report and Written Opinion Issued in PCT Application No. PCT/US21/029263", Mailed Date: Jul. 28, 2021, 12 Pages.

"Non Final Office Action Issued in U.S. Appl. No. 16/904,037", Mailed Date: Mar. 2, 2022, 11 Pages.

"International Search Report and Written Opinion Issued in PCT Application No. PCT/US22/048338", Mailed Date: Feb. 23, 2023, 12 Pages.

"Use the Format Painter", Retrieved from: https://web.archive.org/web/20220410105955/https://support.microsoft.com/en-us/office/use-the-format-painter-4bb415a9-d4e4-42b7-b579-170adc594e40, Apr. 10, 2022, 2 Pages.

"Final Office Action Issued in U.S. Appl. No. 16/904,037", Mailed Date: Jul. 11, 2022, 13 Pages.

"International Search Report and Written Opinion Issued in PCT Application No. PCT/US23/027568", Mailed Date: Nov. 2, 2023, 10 Pages.

"Non Final Office Action Issued in U.S. Appl. No. 16/904,037", Mailed Date: Sep. 22, 2022, 14 Pages.

Nath, Sukanya. "Style Change Detection" Thesis, Department of Computer Science, University of Neuchatel, Oct. 2021 (Year:2021).

Non-Final Office Action issued in U.S. Appl. No. 17/890,714, mailed on Jun. 20, 2024, 23 Pages.

Toshevska, et al. "A Review of Text Style Transfer using Deep Learning". arXiv:2109.15144v1 [cs.CL] Sep. 30, 2021 (Year: 2021).

Final Office Action issued in U.S. Appl. No. 17/890,714, mailed on Sep. 12, 2024, 26 Pages.

\* cited by examiner

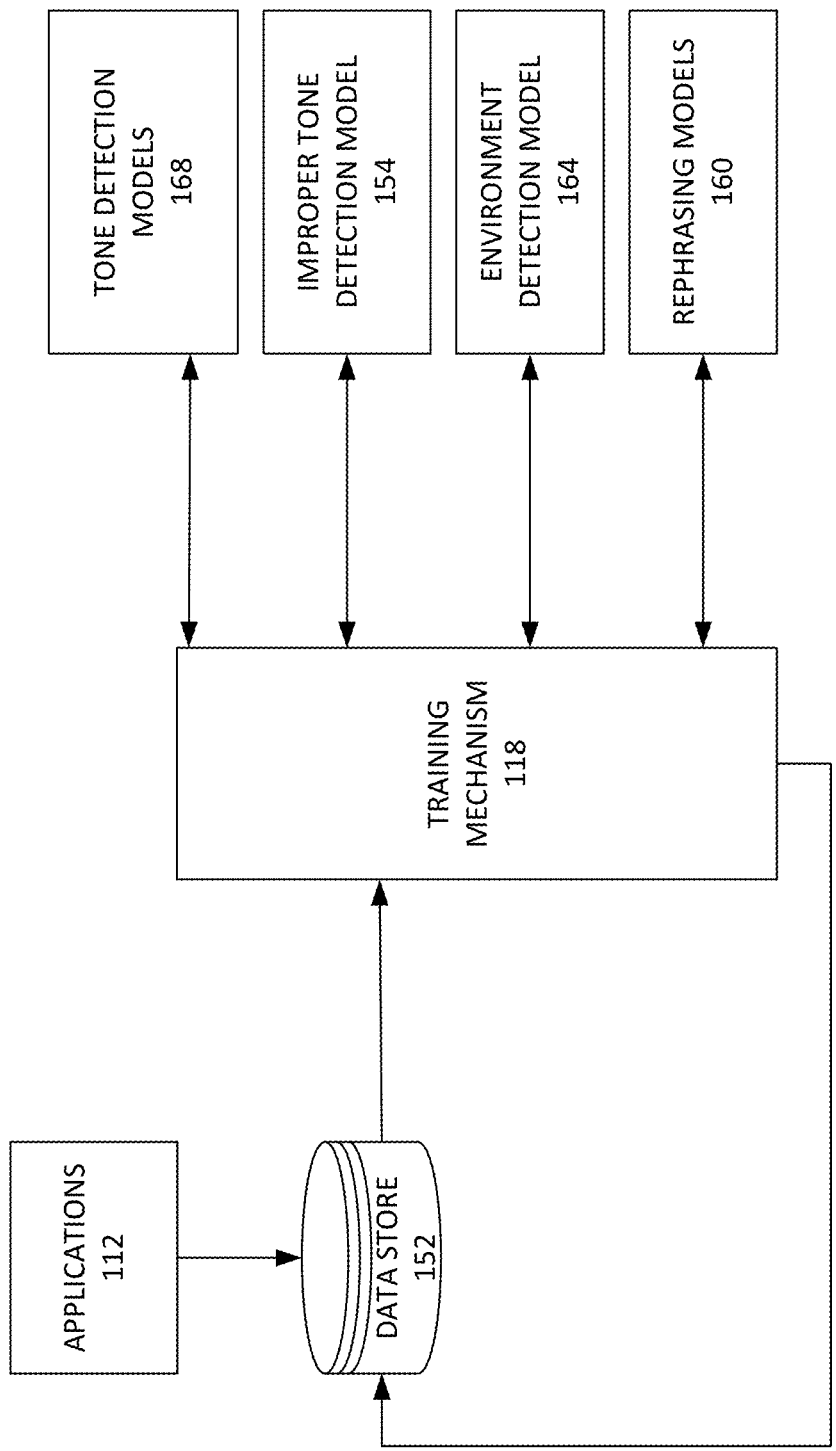

AUTOMATIC TONE DETECTION AND SUGGESTION

BACKGROUND

Users of computing devices often use various content creation applications to create content directed to or reviewed by other individuals. For example, users may utilize an application to write an email, send a text message, prepare an essay, document their work, prepare a presentation and the like. Sometimes while creating content, the user may be unaware of the emotional attitude carried by their content. For example, the user may not realize that one or more sentences in a message they are writing conveys an angry tone. At other times, the user may desire to write a formal message and not notice that some of their content contains informal language.

Furthermore, while some users may notice that the emotional tone carried by their content is inappropriate, they may find it challenging to change the language to convey a proper tone. This is because changing the tone may require a detailed examination of the content to first identify inappropriately worded content and then being proficient in changing the language to convey a desired tone. This is often a time consuming and challenging process.

Hence, there is a need for improved systems and methods of automatic detection, visualization and modification of tone in content.

SUMMARY

In one general aspect, the instant disclosure describes a data processing system having a processor and a memory in communication with the processor wherein the memory stores executable instructions that, when executed by the processor, cause the data processing system to perform multiple functions. The functions may include receiving a request to detect a tone for a content, retrieving user data and data about the content, detecting a content environment for the content based on at least one of the user data and the data about the content, detecting the tone for the content based on the content and the content environment, inputting the content and the detected tone into a machine-learning (ML) model for modifying the tone from the detected tone to a modified tone, obtaining at least one rephrased content segment as an output from the ML model, the rephrased content segment modifying the tone of the content from the detected tone to the modified tone, and providing at least one of the detected tone or the at least one rephrased content segment for display.

In yet another general aspect, the instant disclosure describes a method for providing tone detection for a content. The method may include receiving a request to detect a tone for the content, retrieving user data and data about the content, detecting a content environment for the content based on at least one of the user data and the data about the content, detecting the tone for the content based on the content and the content environment, inputting the content and the detected tone into a machine-learning (ML) model for modifying the tone from the detected tone to a modified tone, obtaining at least one rephrased content segment as an output from the ML model, the rephrased content segment modifying the tone of the content from the detected tone to the modified tone, and providing at least one of the detected tone or the at least one rephrased content segment for display.

In a further general aspect, the instant disclosure describes a non-transitory computer readable medium on which are stored instructions that when executed cause a programmable device to perform functions of receiving a request to detect a tone for a content, retrieving user data and data about the content, detecting a content environment for the content based on at least one of the user data and the data about the content, detecting the tone for the content based on the content and the content environment, inputting the content and the detected tone into a machine-learning (ML) model for modifying the tone from the detected tone to a modified tone, obtaining at least one rephrased content segment as an output from the ML model, the rephrased content segment modifying the tone of the content from the detected tone to the modified tone, and providing at least one of the detected tone or the at least one rephrased content segment for display.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 1A-1C depict an example system upon which aspects of this disclosure may be implemented.

DETAILED DESCRIPTION

Figure 1A:
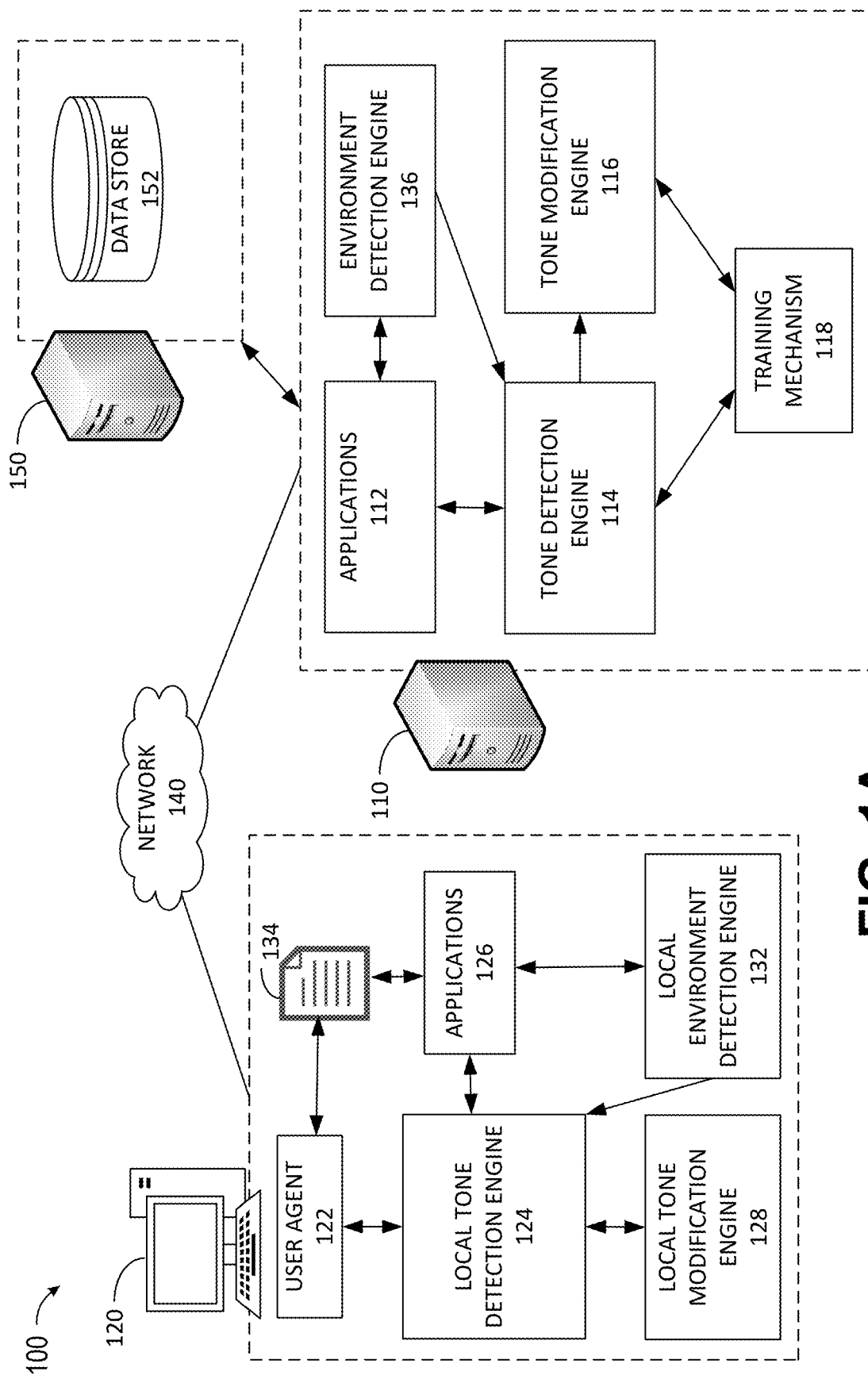

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

In today's fast-paced environment, users of computing devices often create many different types of digital content on a given day. These may include email messages, instant messages, presentations, word documents, social media posts and others. Sometimes, there is not enough time to review the content carefully before it is shared with others. This may be particularly the case with email or instant messages. As a result, users may not recognize that the tone of their content is inappropriate. Other times, even though a user has time to review their content, they may not realize that the tone conveyed by their content is inappropriate. Moreover, even if the user identifies an undesired or inappropriate tone, it may not be easy to revise the tone. For example, it may not be clear to users how to strike the right balance between expressing their emotions and keeping the tone appropriate. Furthermore, reviewing and rewriting the content may take a lot of time and effort.

Some currently used applications offer computer-based tone detection and/or rephrasing of content. However, these currently used reviewing and rephrasing mechanisms often have the technical problem of not taking the content's environment into account when detecting tone. These currently used tone detection mechanisms identify the tone of a given content segment based on detection of certain words or phrases, but do not take into account the intended audience when determining the tone. As a result, a content segment may be identified as, for example, informal without taking into account that the content is not informal for the intended recipient. Thus, the detected tone may be inaccurate for the writing environment in which the writer is operating. Thus, there exists a technical problem of current tone detection mechanisms being computer resource intensive and/or detecting the tone inaccurately.

To address this issue, some currently available tone detection mechanisms take contextual data such as the recipient of the content into account, after the tone has been detected, to determine if the detected tone is an improper tone. This often requires the use of an additional machine-learning (ML) model or other logic, which results in use of additional processing, memory and bandwidth resources. Furthermore, examining contextual data after a tone has been detected to determine whether the detected tone is appropriate for the context requires additional time. Thus, there exists a technical problem of current tone detection mechanisms being time consuming and not efficient in determining appropriateness of a tone for a given writing environment.

To address these technical problems and more, in an example, this description provides a technical solution used for intelligently detecting tone of content by taking the content's writing environment into account during the tone detection process and providing suggestions for changing the tone from the current tone to a different tone. To do so, techniques may be used to examine content (e.g. written or spoken content) and contextual data to detect an environment for the content, parse the content into one or more segments (e.g., sentences and/or phrases), and examine each of the segments to detect one or more tones for the detected content environment. The tone(s) may be detected by utilizing one or more machine-learning (ML) models that are trained to detect specific tones for specific content environments.

Once a tone is detected, a desired tone may be identified and/or received from the user. The desired tone may be used by one or more ML models to provide suggestions for rewriting the segments to convey the desired tone. To achieve this, the segment may be examined along with some or all of the remaining content of the document, context, formatting and/or other characteristics of the document, in addition to user-specific history and information, and/or non-linguistic features. The examined information may be used to provide suggested rephrases for revising the tone of the segment. In one implementation, the detected audience or writing environment, as well as suggested rephrases are displayed in a user interface (UI) element alongside the document to enable the user to assess the detected writing environment and/or view and choose from the suggested rephrases conveniently.

In some implementations, to assist the users in identifying portions of their content that convey an improper tone, mechanisms are used for to identify content portions that are more likely responsible for the detected tone. Those portions may be marked on the UI screen such that the user can quickly identifying words or phrases that are responsible for the conveyed tone and change them, if desired. In some implementations, the display provides a mechanism for the user to select the identified portions by for example hovering over them. Upon selection, a UI element may be displayed that notifies the user of the tone conveyed by the identified portion and/or provides suggestions for rewriting the portion.

Additionally, techniques may be used to receive feedback from the user and utilize the feedback to improve ML models used to detect tone and/or provide the suggested rephrases. The feedback may be explicit, for example, when a user chooses to report a detected tone as incorrect and/or a suggestion as not relevant and/or inaccurate. Furthermore, feedback may be obtained as part of the process based on user interaction with the detected tone and/or selection of the suggested rephrases. For example, the application may transmit information about which suggestion was selected by a user or when the user choose to ignore a warning and send the message without making any changes. This information may be transmitted to a data store to use for ongoing training of the ML models. This type of feedback may be anonymized and processed to ensure it is privacy compliant.

As a result, the technical solution provides an improved mechanism for detection of tone based on the writing environment, thus providing more accurate results in a more efficient manner. Furthermore, the technical solution provides a mechanism for the user to view an identified writing environment and/or intended audience for the content, thus notifying the user of the context of their content. Still further, the technical solution provides rephrase suggestions for revising the tone of content by allowing a user to easily identify portions of the content responsible for a detected tone and enabling the user to quickly select intelligently suggested rephrases for modifying the tone.

As will be understood by persons of skill in the art upon reading this disclosure, benefits and advantages provided by such implementations can include, but are not limited to, a technical solution to the technical problems of inefficient, inadequate, and/or inaccurate tone detection and modification mechanisms. Technical solutions and implementations provided herein optimize the process of detecting improper tone and providing suggestions for modifying the tone by the content environment into account when detecting the tone, thus resulting in more accurate tone detection in a more efficient manner. Furthermore, the technical solutions optimize the process of modifying the tone by notifying the portions of the content responsible for an improper tone by providing easily accessible UI element(s) which contain intelligently suggested rephrases for modifying the improper tone to a desired tone. This may eliminate the need for the user to carefully review the entire content after an improper tone is detected and to come up with their own alternative way of rewriting the content to provide a more proper tone. The benefits provided by these technology-based solutions yield more user-friendly applications, improved communications and increased computer system and user efficiency.

As used herein, the term "document" may refer to an electronic file that includes content such as text (e.g., alphabets, numbers, symbols). The term "tone" may refer to the attitude (e.g., emotional attitude) that is conveyed by written or spoken content. The term "content" as used herein refers to any content (e.g., text or audio) that is created by a user to provide information or convey a message.

FIG. 1A illustrates an example system 100, upon which aspects of this disclosure may be implemented. The system 100 may include a sever 110 which may include and/or execute an environment detection engine 136, a tone detection engine 114, and a tone modification engine 116. The server 110 may operate as a shared resource server located at an enterprise accessible by various computer client devices such as client device 120. The server may also operate as a cloud-based server for offering global tone detection and modification services. Although shown as one server, the server 110 may represent multiple servers for performing various different operations. For example, the server 110 may include one or more processing servers for performing the operations of the environment detection engine 136, tone detection service 114 and tone modification service 116.

The environment detection engine 136 may provide intelligent detection of a content's environment by examining the content as well as contextual data related to the content and/or the user creating the content to identify a content environment for the content. For example, the environment detection engine 136 may retrieve information about the recipient of a message (e.g., by examining the To line of an email message or phone number of an intended text message recipient) or may infer the recipient by examining the content of the message (e.g., to whom is a letter directed, etc.). Furthermore, the environment detection engine 136 may identify the relationship between the sender and the recipient by examining data such as an organization's employee graph. For example, the environment detection engine 136 may determine that the recipient of the message is the sender's boss. In some implementations, the environment detection engine 136 also examines the content and/or the application used to create the content to determine the type of document the content is created for (e.g., email, text message, letter, essay, report). This information may also be taken into account by the environment detection engine 136 when determining the content's environment. The environment detection engine 136 may utilize one or more tone detection ML models to detect environment content, as further discussed below with regards to FIG. 1B.

The tone detection engine 114 may provide intelligent tone detection services within an enterprise and/or globally for a group of users. The tone detection engine 114 may operate to examine content, parse the content into one or more segments when needed, examine an identified content environment for the content and identify one or more tones conveyed by the segment based on the identified content environment. Identified tones may include formal, informal, angry, accusatory, disapproving, encouraging, optimistic, forceful, neutral, egocentric, concerned, excited, worried, regretful, unassuming, curious, sad, and/or surprised, among others. The tone detection service may be provided by one or more tone detection ML models, as further discussed below with regards to FIG. 1B.

The tone modification engine 116 may provide intelligent rewrite suggestions that modify the tone of the original segment. The tone modification service provided by the tone modification engine 116 116 may be provided within an enterprise and/or globally for a group of users. The tone modification engine 116 may operate to receive one or more detected and/or desired tones for a content segment as well as a detected content environment, examine the segment, examine the remining content of the document and/or examine context and non-linguistic features of the document to intelligently suggest one or more rewrite suggestions that change the tone of the segment from the detected tone to a different tone. The tone modification service may be provided by one or more rephasing ML models, as further discussed below with regards to FIG. 1B.

As a general matter, the methods and systems described herein may include, or otherwise make use of, a machine-trained model to identify parameters related to contents. ML generally involves various algorithms that a computer can automatically learn over time. The foundation of these algorithms is generally built on mathematics and statistics that can be employed to predict events, classify entities, diagnose problems, and model function approximations. As an example, a system can be trained using data generated by a ML model in order to identify patterns in user activity and/or determine associations between various words and emotional tone. Such determination may be made following the accumulation, review, and/or analysis of data from a large number of users over time, that may be configured to provide the ML algorithm (MLA) with an initial or ongoing training set. In addition, in some implementations, a user device can be configured to transmit data captured locally during use of relevant application(s) to the cloud or the local ML program and provide supplemental training data that can serve to fine-tune or increase the effectiveness of the MLA. The supplemental data can also be used to facilitate detection of tone and/or to increase the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of these ML models may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, size or complexity of a model may be varied between different ML models, such as a maximum depth for decision trees, or a number and/or size of hidden layers in a convolutional neural network. As another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be continually updated, and one or more of the models used by the system can be revised or regenerated to reflect the updates to the training data. Over time, the training system (whether stored remotely, locally, or both) can be configured to receive and accumulate more and more training data items, thereby increasing the amount and variety of training data available for ML model training, resulting in increased accuracy, effectiveness, and robustness of trained ML models.

The server 110 may be connected to or include a storage server 150 containing a data store 152. The data store 132 may function as a repository in which documents and/or data sets (e.g., training data sets) may be stored. One or more ML models used by the environment detection engine 136, tone detection engine 114 and/or the tone modification engine 116 may be trained by a training mechanism 118. The training mechanism 118 may use training data sets stored in the data store 152 to provide initial and ongoing training for each of the models. Alternatively or additionally, the training mechanism 118 may use training data sets unrelated to the data store. This may include training data such as knowledge from public repositories (e.g., Internet), knowledge from other enterprise sources, or knowledge from other pretrained mechanisms (e.g., pretrained models). In one implementation, the training mechanism 118 may use labeled training data from the data store 152 to train one or more of the ML models via deep neural network(s) or other types of ML algorithms. Alternatively or additionally, the training mechanism 118 may use unlabeled training data. The initial training may be performed in an offline stage or may be performed online. Additionally and/or alternatively, the one or more ML models may be trained using batch learning.

It should be noted that the ML models detecting content environment, detecting one or more tones and/or providing tone modification services may be hosted locally on the client device 120 or remotely, e.g., in the cloud. In one implementation, some ML models are hosted locally, while others are stored remotely. This may enable the client device 120 to provide some tone detection and modification even when the client device 120 is not connected to a network.

The server 110 may also include or be connected to one or more online applications 112 that allow a user to interactively view, generate and/or edit digital content. Examples of suitable applications include, but are not limited to a word processing application, a presentation application, a note taking application, a text editing application, an email application, an instant messaging application, a communications application, a web-browsing application, a collaboration application, and a desktop publishing application.

The client device 120 may be connected to the server 110 via a network 140. The network 140 may be a wired or wireless network(s) or a combination of wired and wireless networks that connect one or more elements of the system 100. The client device 120 may be a personal or handheld computing device having or being connected to input/output elements that enable a user to interact with digital content such as content of an electronic document 134 on the client device 120. Examples of suitable client devices 120 include but are not limited to personal computers, desktop computers, laptop computers, mobile telephones, smart phones, tablets, phablets, smart watches, wearable computers, gaming devices/computers, televisions, head-mounted display devices and the like. The internal hardware structure of a client device is discussed in greater detail in regard to FIGS. 6 and 7.

The client device 120 may include one or more applications 126. Each application 126 may be a computer program executed on the client device that configures the device to be responsive to user input to allow a user to interactively view, generate and/or edit digital content such as content within the electronic document 134. The electronic document 134 can include any type of data, such as text (e.g., alphabets, numbers, symbols), emoticons, still images, video and audio. The electronic document 134 and the term document used herein can be representative of any file that can be created via an application executing on a computer device. Examples of documents include but are not limited to word-processing documents, presentations, spreadsheets, notebooks, email messages, websites (e.g., SharePoint sites), media files and the like. The electronic document 134 may be stored locally on the client device 120, stored in the data store 152 or stored in a different data store and/or server.

The application 126 may process the electronic document 134, in response to user input through an input device, to create and/or modify the content of the electronic document 134, by displaying or otherwise presenting display data, such as a GUI which includes the content of the electronic document 134 to the user. Examples of suitable applications include, but are not limited to a word processing application, a presentation application, a note taking application, a text editing application, an email application, an instant messaging application, a communications application, a web-browsing application, a collaboration application and a desktop publishing application.

The client device 120 may also access applications 112 that are executed on the server 110 and provided via an online service as described above. In one implementation, applications 112 may communicate via the network 140 with a user agent 122, such as a browser, executing on the client device 120. The user agent 122 may provide a UI that allows the user to interact with application content and electronic documents stored in the data store 152 or elsewhere. The UI may be displayed on a display device of the client device 120 by utilizing for example the user agent 122. In some examples, the user agent 122 may be a dedicated client application that provides a UI and access to electronic documents stored remotely. In other examples, applications used to create, modify and/or view digital content such as content of electronic documents maybe local applications such as the applications 126 that are stored and executed on the client device 120, and provide a UI that allows the user to interact with application content and electronic document 134. In some implementations, the user agent 122 may include a browser plugin that provides access to content environment detection, tone detection and tone modification services for content created via the user agent (e.g., content created on the web such as social media posts and the like).

In one implementation, the client device 120 also includes a local environment detection engine 132 for providing some intelligent content environment detection locally. Furthermore, the client device 120 may include the local tone detection engine 124 for providing local intelligent tone detection of content, for example, content in documents, such as the document 134, and a local tone modification engine 128 for performing local intelligent tone modification. In an example, the local environment detecting engine 132, local tone detection engine 124 and local tone modification engine 128 operate with the applications 126 to provide local content environment detection, tone detection and modification services. For example, when the client device 120 is offline, the local environment detection, tone detection and/or modification engines may make use of one or more local repositories to detect content environment, detect tone and/or provide suggestions for modifying the tone. In one implementation, enterprise-based repositories that are cached locally are also used to provide local content environment detection, tone detection and/or tone modification. It should be noted that each of the environment detection engine 136, tone detection engine 114, tone modification engine 116, local environment detection engine 132, local tone detection engine 124 and local tone modification engine 128 may be implemented as software, hardware, or combinations thereof.

Figure 1B:
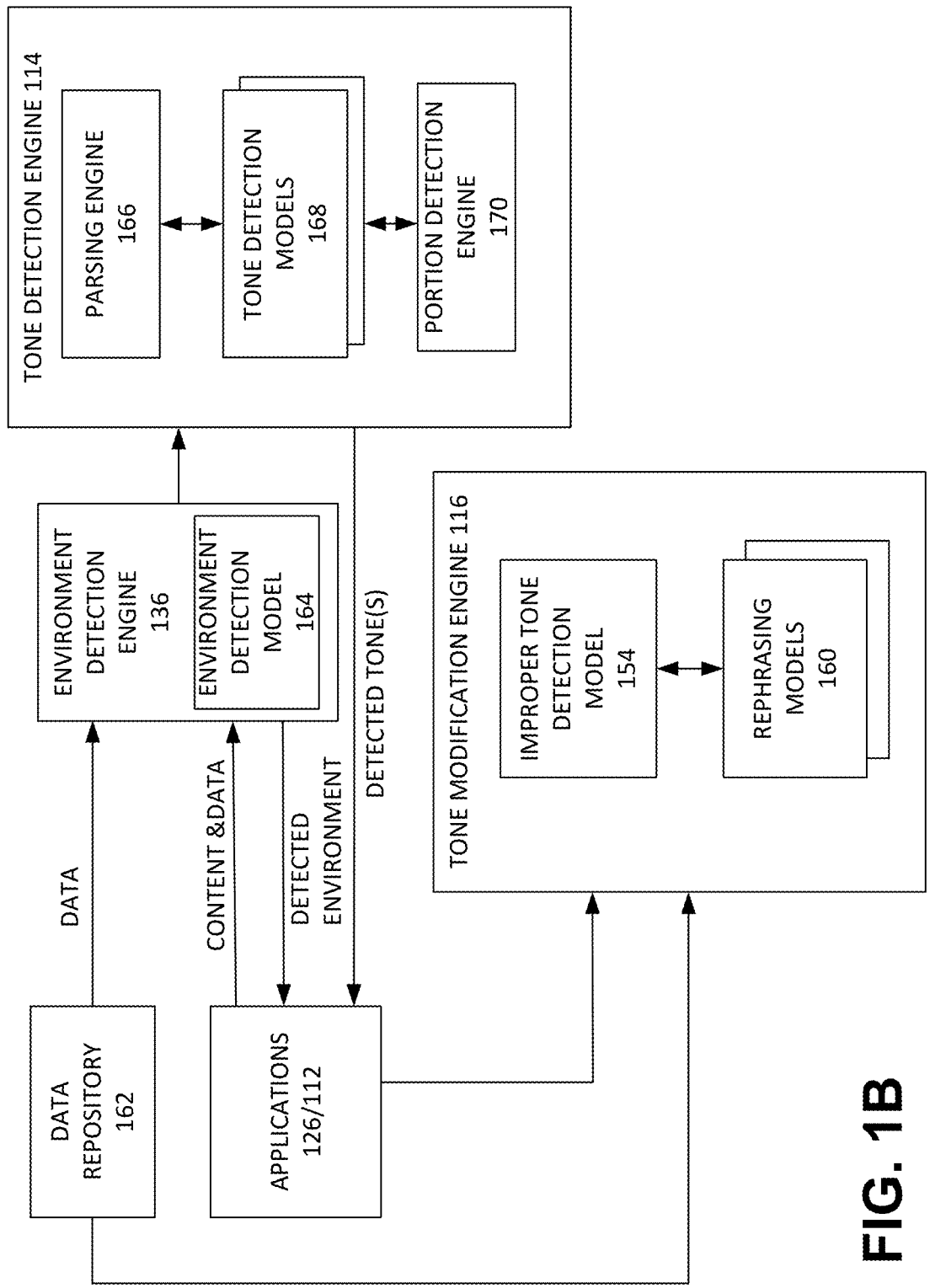

FIG. 1B depicts a system level data flow between some of the elements of system 100. As discussed above, content being viewed, edited or created by one or more applications 126 and/or online applications 112 may be transmitted to the environment detection engine 136 and tone detection engine 114 to identify one or more tones associated with one or more segments of the content. In some implementations, content transmitted to the tone detection engine 114 includes those created via the user agent 122 (shown in FIG. 1A). For example, the content may originate from a website the enables the user to write a post. In such instances, the content may be transmitted from the user agent 122 to the environment detection engine 136 and tone detection engine 114. The content may be transmitted upon a user request. For example, when the user utilizes an input/output device (e.g. a mouse) coupled to the client device 120 to invoke a UI option requesting tone detection for a selected content segment, the selected content segment may be transmitted along with the request for tone detection. Alternatively, the content may be transmitted without direct user request (e.g., in email applications or instant messaging applications) to enable automatic notification of detected or improper tone. For example, some applications may automatically submit a request for tone detection when as the user creates content (e.g., when the user finishes writing a sentence) or when the user utilizes a UI element to initiate transmission of the content (e.g., when the user clicks send for an email message).

In addition to the content, the environment detection engine 136 and/or tone detection engine 114 may receive data stored in a data repository such as data repository 162 or retrieved by the applications 126/112. The data may include information about the application used for content creation, contextual information about the document from which the content originates, information about the user creating the content and/or other relevant information. For example, information about the type of document (e.g., word document, email, presentation document, essay, report, etc.) and the topic of the document may be transmitted with the tone detection request and/or separately. In another example, information about the recipient or intended reader of the content may be transmitted to the environment detection engine 136 and/or tone detection engine 114. Such information may be provided by the applications 126/112 and/or by ML models used to infer information about the document.

Furthermore, information about the user creating the content may be transmitted to the environment detection engine 136 and/or tone detection engine 114 from the applications 126/112 and/or data repository 162. The information may include the position of the user within an organization (e.g., the user's job title or department to which the user belongs, if known) and associations between the user and an intended recipient or reader of the content. The associations may be determined by utilizing an organizational graph that includes information about various users in an organization. In some implementations, some of the information transmitted with the request is transmitted from the data repository 162. The data repository 162 may contain user-specific data about the user. For example, it may contain user profile data (e.g., the user's job title, various profiles within which the user creates content such as work profile, blogger profile, social media profile and the like) and/or user history data (e.g., the user's writing style, preferred tone, and the like). The data contained in the data repository 162 may be provided as an input directly from the data repository 162 or it may be retrieved and/or inferred by applications 126/112 and transmitted from them.

The environment detection engine 136 may transmit the received contextual data, user data, graph data and/or content to an environment detection model 164 which examines the input parameters to identify a content environment for the content as an output. The identified content environments may include an identification of the type of content and/or the intended audience for the content. For example, detected content environments may include email to peer, email to manager, group email to friends, group email to co-workers, group email to superiors, letter to client, report for supervisor, text message to spouse, social media post viewable by friends and the like. The environment detection engine 136 may examine information about an intended recipient of the content, examine associations between the intended recipient and the sender, and/or examine the type of content being created to detect the writing environment. In some implementations, detecting the content environment is achieved by utilizing rule-based logic that does not utilize ML models. For example, the environment may be detected based on attributes related to audiences of the content (e.g., presence of manager, external clients, mailing lists, etc. as a recipient) or based on detection of certain keywords in the message subject or body (e.g., presence of word buddy indicates the recipient is a close friend). The rules may also be based on other metadata such as the number of recipients in the to/cc/bcc fields and the like.

The detected content environment, content and/or data may be transmitted to the tone detection engine 114 for tone detection. The content transmitted for tone detection may include one or more segments. For example, the content may include multiple sentences (e.g., a paragraph or an entire document). When the transmitted content includes more than one sentence, the tone detection service 114 may utilize a parsing engine 166 to parse the content into one or more smaller segments. In some implementations, this involves parsing the content into individual sentences, where each sentence constitutes one segment for tone detection. If the content does not include individual sentences (e.g., it includes one or more phrases that are not sentences), the content may be parsed into separate segments. For example, the content may be examined to determine if more than one phrase is included within the content and if so to parse the content into the individual phrases. The parsing engine 166 may include one or more classifiers used to classify content into sentences and/or phrases. Thus, the parsing engine 166 may receive the content as an input and provide the parsed segments as an output.

The parsed segments and detected content environment may be transmitted to a plurality of tone detection models 168 for determining if each segment conveys a specific tone for the given content environment. This may be achieved by utilizing a plurality of trained tone detection models 168.

Each tone detection model may be an ML trained for detecting a specific tone. For example, there may be a tone detection model for detecting informal tones, while there is another tone detection model for detecting impolite tones. In some implementations, one or more of the tone detection models 168 are trained deep neural network (DNN) models for detecting a given tone. Because of latency concerns, each tone detection model may be a small model that is able to operate in a timely manner.

In some implementations, each tone detection model may include one or more classifiers that classify the segment as either being associated or not associated with a specific tone. In some implementations, the classifier may calculate a score for the level of association of each segment with the tone. The score may be calculated based on one or more words or phrases in the content segment and their associations with a given tone.

Once the score is calculated for a given tone by that tone detection model, the calculated score may be compared against a threshold requirement to determine if the score meets the required threshold. The threshold requirement for a given tone may vary depending on the content environment. For example, the threshold requirement for casual tone of an email to a peer may be 90% while the threshold requirement for an email to a manager may be 60%. In another words, if an email to a manager is identified as being 60% associated with a casual tone, casual may be identified as the tone detected for the email. However, if the writing environment for the same email is identified as an email to a peer (because of the 90% threshold requirement) casual may not be identified as a tone detected for the email. The threshold requirements may be predetermined and/or they may be learned by the ML models based on user data (e.g., feedback data). Thus, each tone detection model 168 may receive as an input the parsed segments, detected content environment and/or data related to the user, application, document and the like, and may provide as an output a determination of whether the segment conveys a specific tone for the detected content environment.

In some implementations, the calculated score from each tone detection model is used to determine an overall tone for the content (e.g., for multiple sentences, a paragraph or a document). For example, the calculated score for each segment may be utilized as a parameter used in a weighted sum of the segments (e.g., each segment is given a weight multiplied by its determined score to calculate the weighted sum for the content). In such a scenario, in addition to the determination of whether the segment conveys a specific tone, each tone detection model 168 may also provide the score. The tone detection engine 114 may then calculate the overall tone for the document based on the aggerated scores from each tone detection model and/or segment.

Because there may be multiple tone detection models 168 that detect different tones, each segment may be identified as having multiple tones. For example, a segment may be identified as being both angry and informal, while a different segment is identified as being both sad and angry. Once the detected tone(s) are identified, the detected tone(s) and if identified, the overall tone of the document may be transmitted back as an output to the applications 126/112, where they are used to provide display data to the user to notify the user of the detected tones. In some implementations, instead of or in addition to the tone detection models 168, rule-based logic is utilized to determine if a parsed segment conveys a specific tone.

In some implementations, once a tone is detected for a content segment, the portion detection engine 170 is used to identify portions of the content that are likely are responsible for detecting the tone. This may be achieved by examining each segment to identify words and/or phrases that were identified as being associated with the detected tone. In some implementations, the portion detection engine 170 utilizes SHAP SHapley Additive explanations (SHAP) values to break down a prediction to show the impact of each word on the predicted tone. SHAP values may be used to estimate marginal contribution of an individual word or phrase on the outcome for all possible permutations of word orders. The average contribution for each word may then be recorded as that word's contribution on the outcome. The average contribution score for the words may then be used to rank the words in order of their contribution to the detected tone. Words having the top one or few average contribution scores may then be identified as the words likely responsible for the detected tone. Instead of SHAP values, alternative implementations may utilize other mechanisms for interpreting ML model results. For example, Local Interpretable Model-Agnostic Explanations (LIME) is used in some implementations.

In some implementations, in addition to the detected tones and words responsible for the detected tones, suggested rewrites that modify the tone from an improper tone to a more proper may also be provided. To achieve this, the tone detection engine 114 may transmit the detected tone(s) and/or word(s) responsible for the detected tones to the tone modification engine 116. The tone modification engine 116 may include an improper tone detection model 154 for determining if any of the detected tones are improper. In some implementations, the tone detection model 154 may include a classifier that classifies certain tones as improper. For example, angry, accusatory, and disapproving tones may automatically be flagged as improper tones.

Alternatively, the improper tone detection model 154 may take into account additional information in determining whether a detected tone is improper. This may involve receiving the identified content environment and/or data such as contextual data about the content, user data and the like. This data may be received from the environment detection engine 136, data repository 162 and/or applications 126/112 and may be used to determine if the detected tone(s) are improper for the detected environment within the context of the content being generated. This is because, while certain tones may be proper in certain situations, they may not be proper for others. For example, while an angry email to a friend may be proper in some situations, it is most likely improper when directed to the writer's manager. By utilizing an improper tone detection model 154 that takes the detected environment into, the tone modification engine 116 may determine when to notify the user of an improper tone. It should be noted that while the improper tone detection model 154 is shown as being part of the tone modification engine 116, it may be included as part of the tone detection service 114 or may function as a separate service. When included as part of the tone detection service, along with the detected tone(s), the tone detection engine 114 may also provide an indication for each detected tone on whether the detected tone is an inappropriate tone. Thus, the improper tone detection model 154 may receive as an input the detected tone(s) and content environment and/or additional data and provide as an output a determination of a detected improper tone. The output may be provided back to the applications 126/112 for display to the user.

In addition to the improper tone detection model 154, the tone modification engine 116 may include one or more rephrasing models 160. Each rephrasing model 160 may include one or more ML models that enable rephrasing the segment to modify the tone from a detected tone to a desired tone. For example, the rephrasing models 160 may include one rephrasing model for rephrasing the segment in a manner that modifies the tone of the segment from informal to formal. Another rephrasing model may rephrase the segment from angry to neutral. Yet another rephrasing model may rephrase the segment from impolite to polite. In some implementations, a rephrasing model can modify the segment to convey a desired tone regardless of its detected current tone(s). For example, one model may be used to rephrases all segments having a variety of tones to convey a formal tone. Another model may be used to rephrase all segments such that they convey a neutral tone, and the like. Thus, rephrasing models may provide one or more suggested rephrases that modify a segment to convey a desired tone (e.g. polite, neutral, formal, etc.).

To achieve this, each rephrasing model may take into account parameters relating to the detected content environment and/or user, user history data (user's usual writing style), type of content, type of document, and/or type of application, and provide suggested rephrases that modify the tone to a desired tone while taking into account the content, context and user preferences. As a result, each rephasing model may receive as an input a segment having an identified tone and a detected content environment as well as additional data and provide as an output one or more suggested rephrases for the segment that convey a desired tone. The suggested rephrases may be transmitted to the applications 126/112 for display to the user.

In some implementations, the desired tone is requested by the user. For example, the user may utilize a UI element of the applications 126/112 to set the desired tone of the content to a specific tone (e.g., a menu option is used to set the tone of the document to neutral). In another example, the user may utilize a UI element to request that specific detected tones be converted to specific desired tones (e.g., modify impolite tones to polite tones). The desired tone may be transmitted from the applications 112/126 to the tone modification engine 116, where the desired tone may be used to identify which rephrasing model 160 to use for providing rephrasing suggestions.

In alternative implementations, the desired tone is predetermined or may be determined based on the detected content environment. For example, there may be one or more predetermined desired tones for each improper tone (e.g., angry to neutral, impolite to polite, informal to formal). In another example, the desired tone for an email to a manager is predetermined as being formal and polite. Once the improper tone detection model 154 identifies an improper tone, the tone modification engine 116 may identify a corresponding desired tone for the improper tone and send a request to the rephrasing model for the desired tone to provide suggested rephrases.

In some implementations, the desired tone is determined based on an examination of content that is similar to the current content. For example, based on the detected environment, type of document, and the like, the tone modification engine 116 may search for and identify one or more previously created or sent documents that are closely matched with the current document (e.g., an email that was recently sent by the same user to the same group of recipients having a similar subject and/or similar length). A detected tone for the closely matched document(s) may then be retrieved and used as an example of a proper tone for the document. In some implementations, closely matching documents are identified and used to provide a list of one or more tones commonly associated with the type of content being created by the user.

It should be noted a that the local environment detection engine 132 and tone detection engine 124 of the client device 120 (in FIG. 1A) may include similar elements and may function similarly as the environment detection engine 136 and tone detection engine 114, respectively. Furthermore, the local tone modification service 128 of the client device 120 (in FIG. 1A) may include similar elements and may function similarly as the tone modification engine 116 (as depicted in FIG. 1B).

FIG. 1C depicts how one or more ML models used by the environment detection engine 136, tone detection engine 114 and tone modification service 116 may be trained by using the training mechanism 118. The training mechanism 118 may use training data sets stored in the data store 152 to provide initial and ongoing training for each of the models included in the environment detection engine 136, tone detection engine 114 and tone modification engine 116. For example, the environment detection model 164, tone detection models 150, improper tone detection model 154 and rephrasing models 160 may be trained by the training mechanism 118 using corresponding data sets from the data store 152.

The tone detection models 150 may be trained by first identifying a number of tones for which the models should be trained. These tones may include formal, informal, angry, accusatory, disapproving, encouraging, optimistic, forceful, neutral, egocentric, concerned, excited, worried, regretful, unassuming, curious, sad, and/or surprised. Then, a large number of segments (e.g., sentences) may be collected. These may be collected from user data or from public sources such as the Internet. Each of the segments in the collected data may be then labeled as conveying one or more tones. The labeling process may be performed by a number of users. The labeled data may then be parsed to create individual groups of segments that relate to each tone. The individual groups of segments may then be used in a supervised learning process to train each of the tone detection models. The tone detection models may then be fine-tuned on a Turing Natural Language Generation (T-NLG) language model such as TNLR v3 model.

The improper tone detection model 154 and environment detection model 164 may be similarly trained using a supervised learning process by using labeled data. The rephrasing models 160, on the other hand, may be trained using one or more pretrained models such as GP, UniLM and others for natural language processing (NPL). The pre-trained models may be used to train each rephrasing model 160 to rewrite a segment in a manner that conveys a specific tone (e.g., polite, formal, etc.).

To provide ongoing training, the training mechanism 118 may also use training data sets received from each of the trained ML models (models included in the environment detection engine 136, tone detection engine 114 and tone modification engine 116). Furthermore, data may be provided from the training mechanism 118 to the data store 152 to update one or more of the training data sets in order to provide updated and ongoing training. Additionally, the training mechanism 118 may receive training data such as knowledge from public repositories (e.g., Internet), knowledge from other enterprise sources, or knowledge from other pre-trained mechanisms.

Figure 2A:
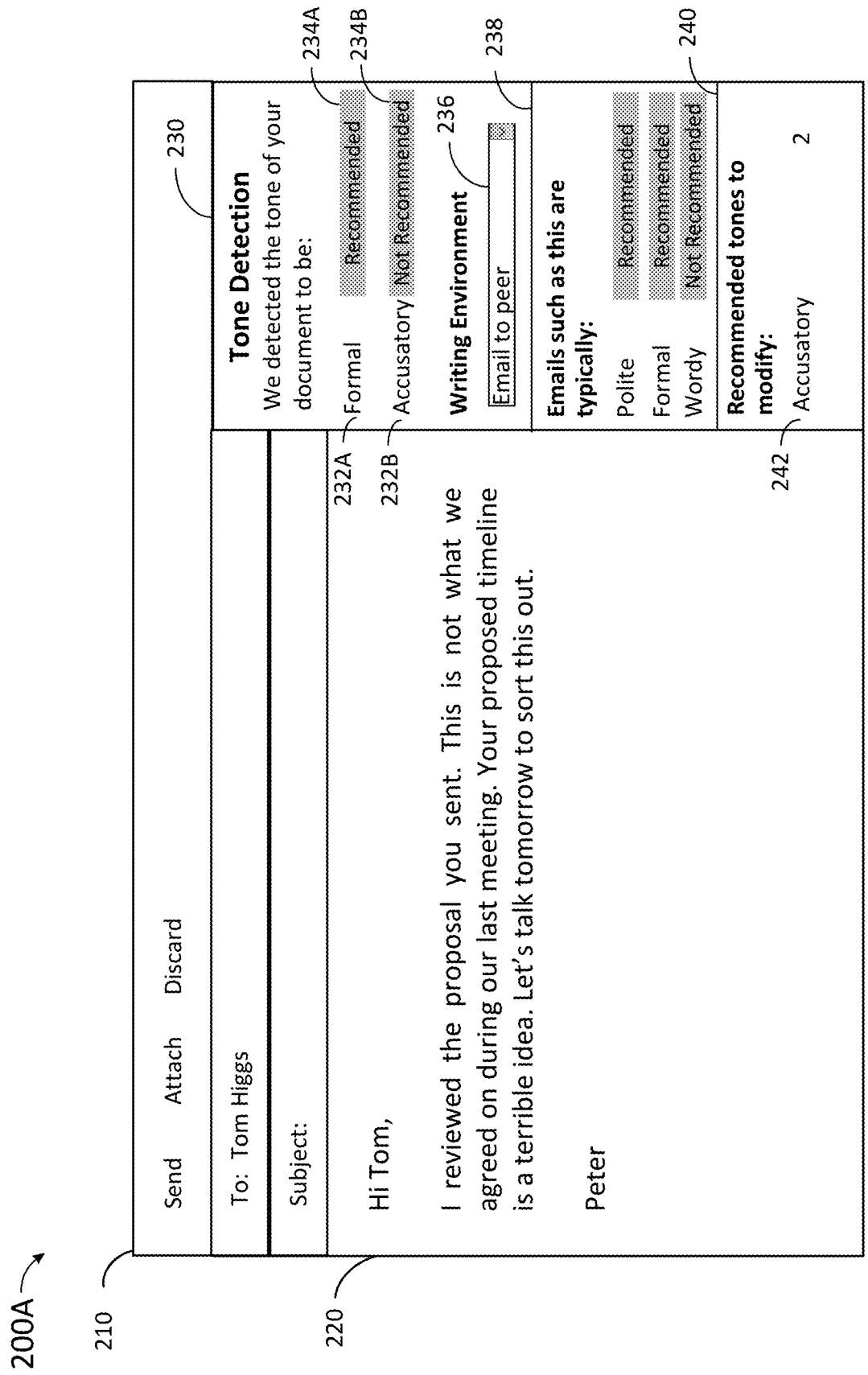
FIG. 2A-2B are example graphical user interface (GUI) screens for tone detection of content being created by a user.
Figure 2B:
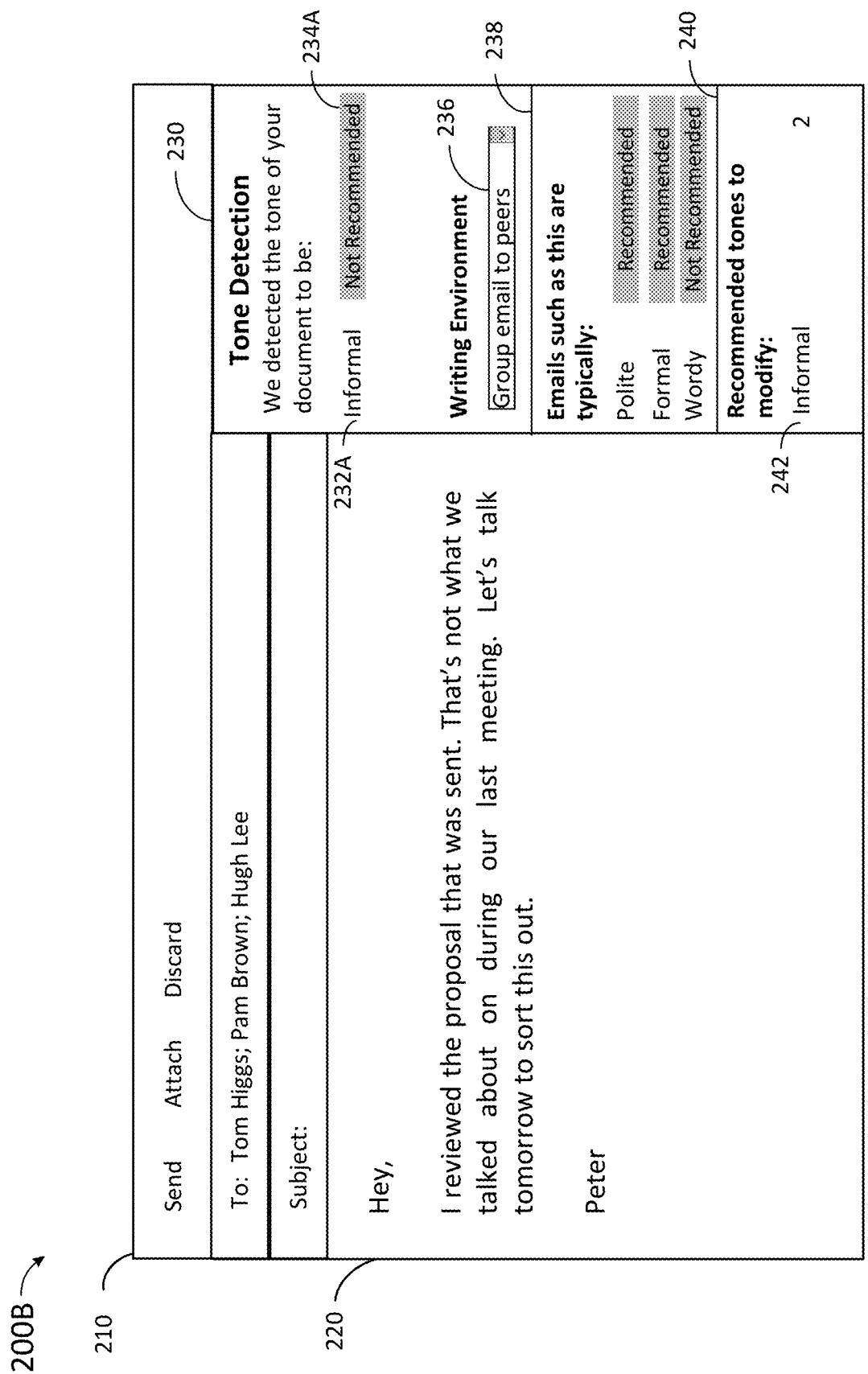

FIG. 2A-2B are example GUI screens for tone detection of content being created by a user. FIG. 2A is an example GUI screen 200A of a communication application such as an email application (e.g., Microsoft Outlook®) displaying an example email message being created. GUI screen 200A may include a toolbar menu 210 containing various tabs each of which may provide multiple UI elements for performing various tasks. For example, the toolbar menu 210 may provide menu options for the user to perform one or more tasks for creating or editing the document. Screen 200A may also contain a content pane 220 for displaying the content of the document. The content may be displayed to the user for viewing and/or editing purposes and may be created by the user. For example, the user may utilize an input device (e.g., a keyboard) to insert input such as text into the content pane 220.

As the user creates or edits content of the content pane 220, the user may utilize a UI element for transmitting a request for tone detection and/or suggestion. For example, the user may select one of the menu options provided under the toolbar menu 210 to display the tone detection pane 230 for performing tone detection and/or suggestion for the entire message. Alternatively, the user may select a portion of the document and utilize a UI element such as a menu option of a context menu (e.g., by right-clicking on the selected portion and selecting a tone detection option from a context menu) to display detected tones and/or tone suggestions for the selected portion. A selected text portion can be any portion of the content and may include one or more words, sentences or paragraphs. The textual content may include any type of alphanumerical text (e.g., words and numbers in one or more languages). In one implementation, a text segment may also include known symbols, emoticons, gifs, animations, and the like. The tone detection pane 230 may displayed adjacent to the content pane 220. Alternatively, other types of UI elements such as pop-up menus and others may be utilized to display detected tones and/or rewrite suggestions.

Once the request for tone detection is received and processed, detected tones 232A-232B may be displayed in the tone detection pane 230. In addition to the detected tones 232A-232B, the tone detection pane 230 may also display a UI element 234A-234B for each of the detected tones. The UI elements 234A-234B may notify the user whether the each detected tone is recommended or not for the document. As discussed above, this may be done by examining the writing environment, among other parameters. To ensure that the writing environment was detected accurately and to notify the user of the detected audience, tone detection pane 230 may also include a UI element 236 for displaying the detected writing environment. The UI element 236 may be a dropdown menu that enables the user to change the writing environment if they disagree with the detected writing environment. In this manner, the GUI screen 200A enables the user to provide feedback regarding the detected writing environment. The feedback may be collected and used to further training the ML model. Moreover, allowing the user to change the writing environment enables the user to customize the tone detection process, as needed.

In implementations in which documents that are closely related to or closely similar to the current document are examined and identified, tones typically associated with such documents are retrieved and displayed in the UI portion 238 of the tone detection pane 230. For example, the UI portion 238 may provide a list of common tones for similar emails such as polite, formal and wordy. Furthermore, the UI portion 238 may include UI elements that notify the user whether each common tone is recommended or is not recommended for the email.

To enable the user to easily and quickly change an improper tone, the GUI screen 200A may include a UI portion 240 for displaying the improper tones. In an example, the UI portion 240 includes a list of improper tones as well as a number for each portion of the document that is detected as being responsible for the improper tone. Selecting an improper tone in the UI portion 240 (e.g., clicking on a displayed tone) may then cause the portions of the document responsible for the improper tone to be identified in the content pane 220, as further discussed below with respect to FIGS. 3A-3B.

As the user creates content or modifies the document, the detected tone, detected writing environment, and/or tone recommendations in the tone detection pane 230 may change. This is illustrated in GUI screen 200B of FIG. 2B in which upon making changes to the content of the content pane 220 and the receivers in the To line of the email, the detected tone 232A was changed to informal, while the detected writing environment 236 was changed to group email to peers. Similarly, content of the UI portion 240 was changed to display the detected tone informal as a tone refinement suggestion. Thus, writing environment and tone detection occurs dynamically and in real time in response to the latest content of the document being created.

Figure 3A:
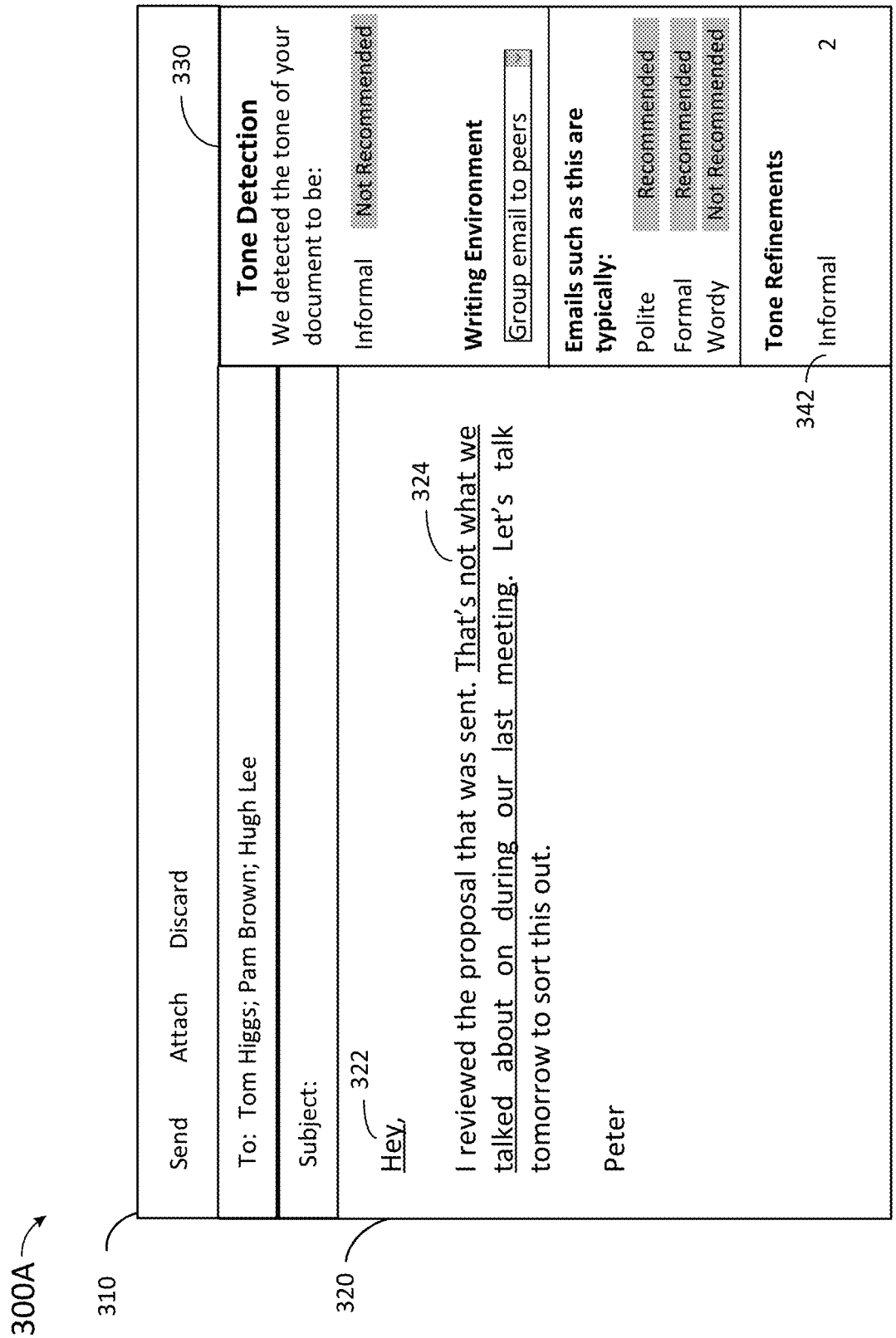
FIGS. 3A-3B are example GUI screens for displaying portions of content responsible for a detected tone and for displaying rephrase suggestions.
Figure 3B:
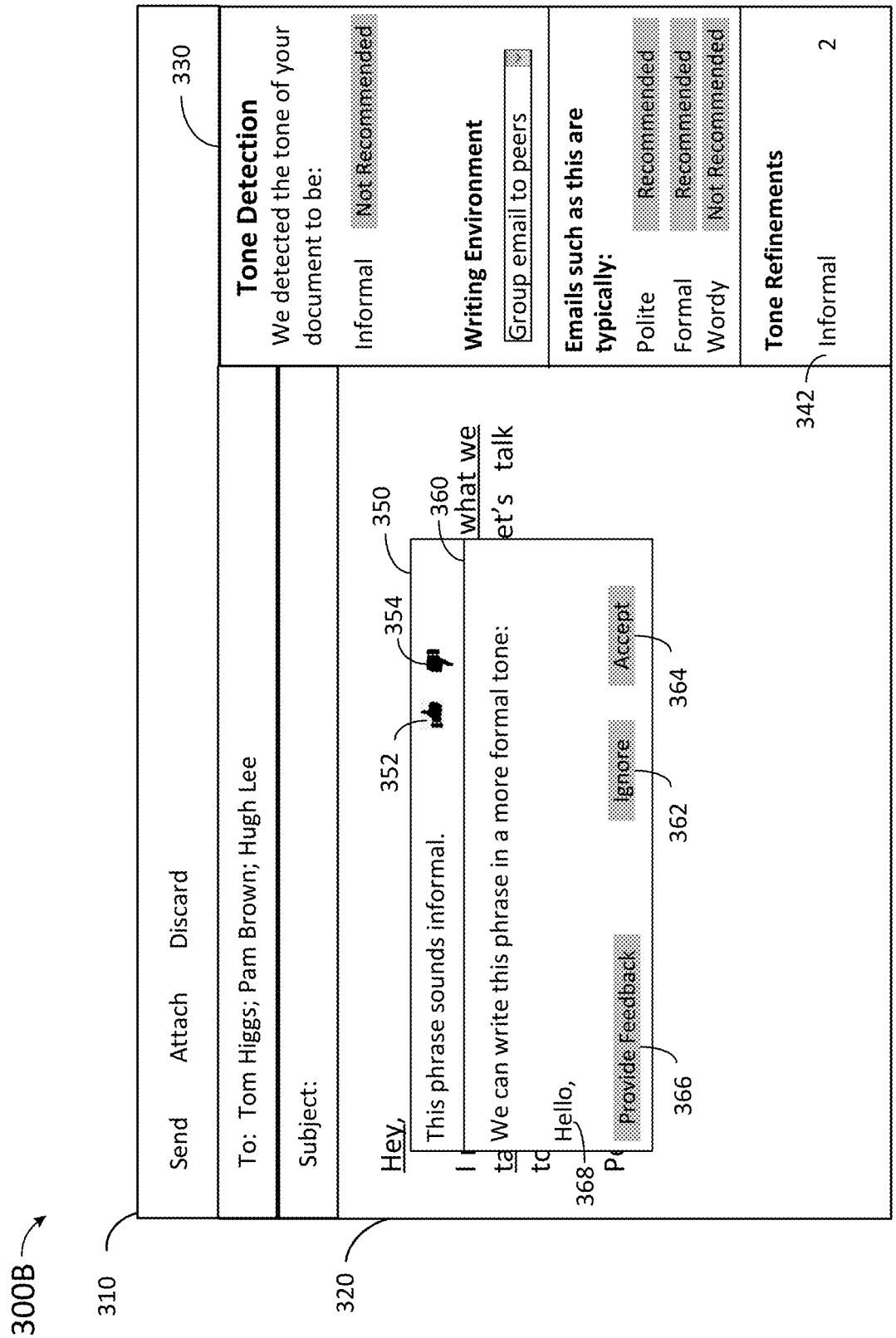

In an example, selecting the informal tone 242 in the UI portion 240 results in displaying identifying information for the portions of content responsible for the detected tone. This is illustrated in FIGS. 3A-3B which are example GUI screens for displaying portions of content responsible for a detected tone and for displaying rephrase suggestions. Screen 300A of FIG. 3A depicts a toolbar menu 210 of a communication application such as an email application and a content pane 320 of a draft email message being created.

Once the user selects a tone 342 identified as a tone that is recommended for modification, the portions 322 and 324 that are responsible for the detected tone may be identified in the content pane 320. As the depicted, the responsible portions can be detected and/or depicted at the word and/or sentence level. In an example, portions 322 and 324 may be identified by using visual cues such as being underlined, highlighted, changes to the text color and the like. In this manner, the use can quickly and easily identify the portions of the content that need to be changed. As a result, the user can choose to modify the content themselves, if desired, select to ignore the suggestion or choose to view more information about the detected tone and/or rewrite suggestions.

When the user decides to view more information about an identified portion such as portion 320, they may hover over the portion 322 or otherwise select the portion (e.g., by clicking on the portion). Upon selection, a UI element such as the UI element 350 of GUI screen 300B in FIG. 3B may be displayed. The UI element 350 may be a pop-up menu option that includes an indication of the identified improper tone. For example, the UI element 350 may The UI element 340 may notify the user that the selected phrase sounds informal. Furthermore, the UI element 350 may include UI elements 352 and 354 for receiving explicit user feedback regarding the detected tones. For example, the UI element 352 may be used to provide positive feedback indicating that the detected tone is accurate, while the UI element 352 may be used to provide negative feedback indicating that the detected tone is inaccurate. The received user feedback may be collected and used to provide ongoing training for the ML models used in detecting tone. Many other UI configurations for enabling the user to provide feedback for the detected tones are contemplated. For example, various menu options may be provided for each detected tone or the entirety of detected tones to enable the user to provide feedback.

Additionally, the UI element 350 may contain a UI portion 360 for displaying one or more suggested rephrases such as the suggested rephrase 368 for modifying the tone from the improper tone to a more proper tone for the content being created. In some implementations, clicking on the suggested rephrase 368 may result in the automatic replacement of the text portion 322 with the suggested rephrase 368. Alternatively, a UI element 364 may be utilized to accept the suggested rephrase 368. Furthermore, the UI element 350 may include a UI element 362 (e.g., ignore button) for choosing to ignore the detected tone and/or suggested rephrase. In some implementations, when a user chooses to ignore a detected tone and/or suggested rephrase, information regarding the detected tone and/or suggested rephrase may be collected as user feedback to be used in finetuning the trained models. Furthermore, explicit feedback regarding the suggested rephrase may be provided by utilizing the UI element 366.

Figure 4:
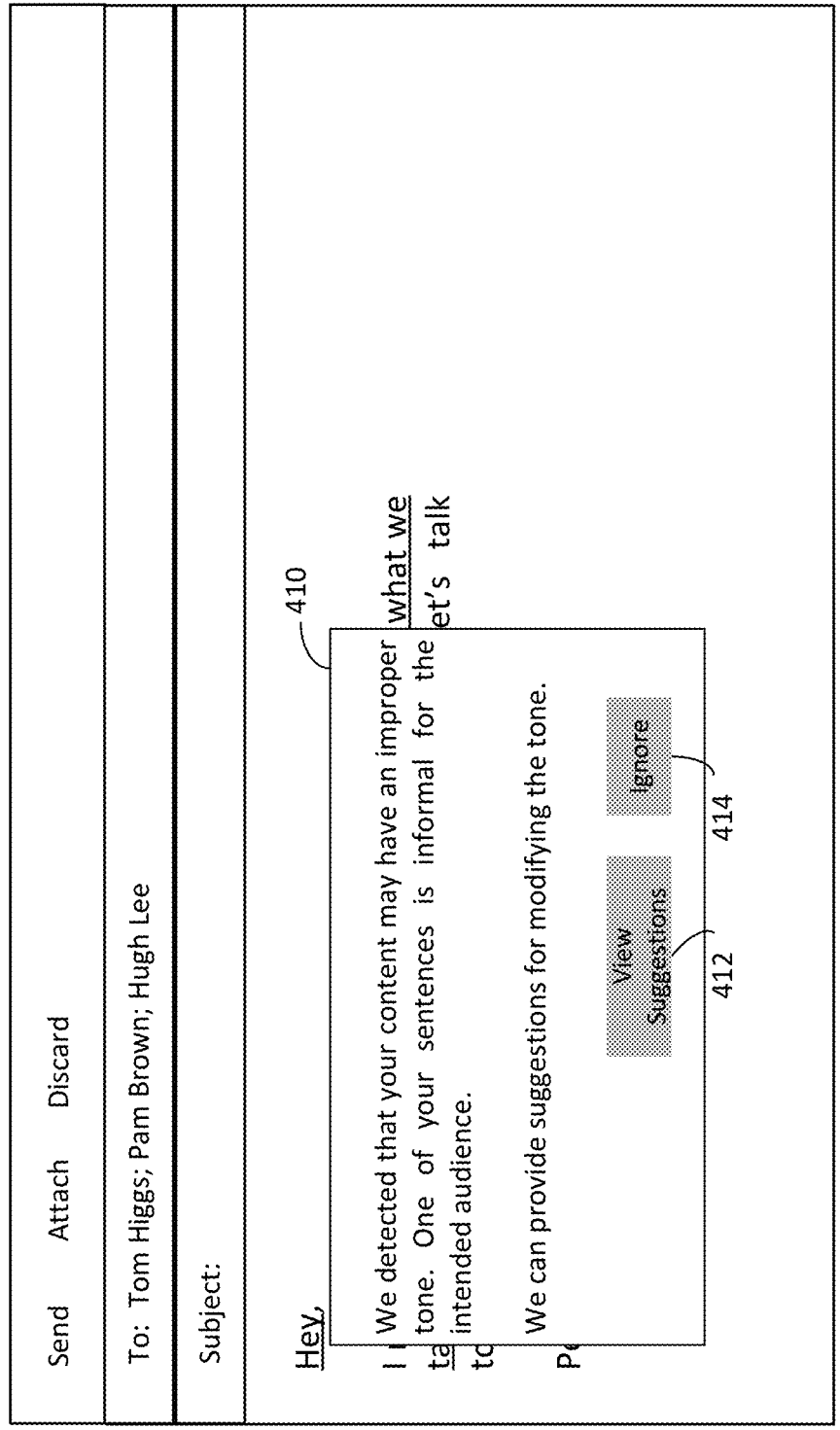
FIG. 4 is an example GUI screen for providing improper tone notification and modification without user request.

In some implementations, for content such as email messages, instant messages, web postings and the like, where the content the user is creating relates to communications with one or more other individuals, the content creation application and/or web browser plugin may function to automatically perform tone detection. This may be done to warn the user of tone that may be disrespectful or otherwise improper when the user is communicating with others. In some implementations, automatic tone detection may be done by first determining when a text segment is complete (e.g., when a sentence is complete) and then submitting the completed text segment for tone detection upon its completion. Alternatively and/or additionally, automatic tone detection may be performed once a determination is made that content creation is complete (e.g., the user's name at the end of the email message or when the user clicks on send). In such a configuration, a UI element may automatically be displayed to notify the user of existence of improper tone in the content. FIG. 4 is an example GUI screen 400 for providing improper tone notification and modification without user request. In some implementations, upon occurrence of specific triggering events such as completion of message or receiving a request to send the message, the UI screen of the application may automatically display a UI element such as the UI element 410 to notify the user that the content may convey an improper tone. The UI element 410 may notify the user of the type of tone detected. In some implementations, the UI element 410 also provides a link to the portion of the content responsible for the detected tone. Furthermore, the UI element 410 may include a UI element 412 for viewing rewrite suggestions and UI element 414 for ignoring the notification.

It should be noted that although the current disclosure discusses written content, the same methods and systems can be utilized to provide paraphrases for spoken words. For example, the methods discussed herein can be incorporated into or used with speech recognition algorithms to provide for tone detection and modification of a spoken phrase. For example, when a speech recognition mechanism is used to convert spoken words to written words, the user may request tone detection and modification for a spoken phrase. The spoken phrase may then be converted to a text segment before the text segment is examined and processed to provide tone detection and modification. The detected tone and/or suggested rephrase may then be spoken to the user.

Figure 5:
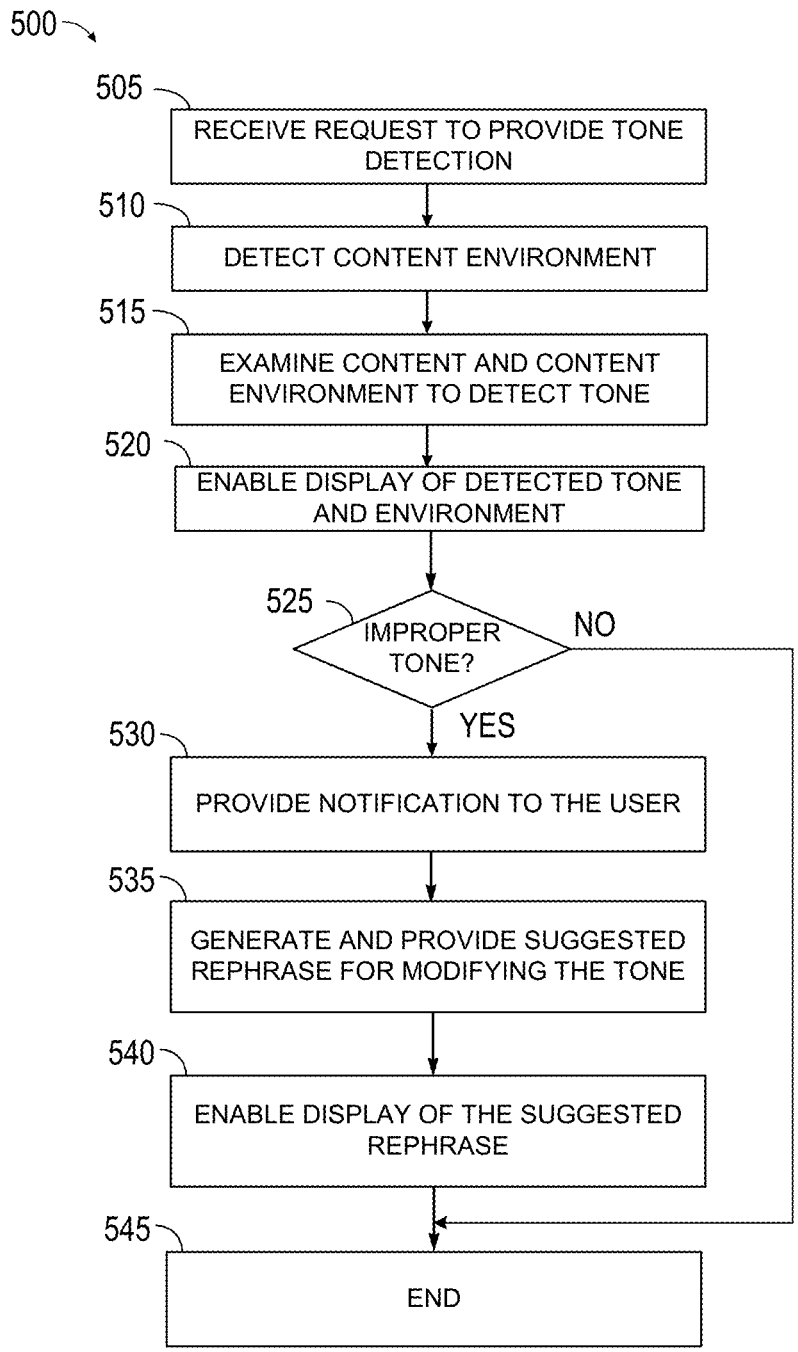
FIG. 5 is a flow diagram depicting an example method for providing intelligent tone detection and/or modification for a given content.

FIG. 5 is a flow diagram depicting an exemplary method 500 for providing intelligent tone detection and/or modification for a given content. At 505, method 500 may begin by receiving a request to provide tone detection for a given text segment. This may occur, for example, when the user utilizes an input/output device (e.g. a mouse) coupled to a computer client device to a select a text segment (e.g., a text string containing one or more words, icons, emoticons and the like) in a document displayed by the client device and proceeds to invoke a UI element to request that tone detection be provided for the selected text segment. In some implementation, the request for tone detection is for the entire document. For example, the user may select a menu option for performing tone detection for the entire document.

In one implementation, a request may be received when a predetermined action takes place within the content pane of the document (e.g., a special character is entered, or a predetermined keyboard shortcut is pressed). In some implementation, the request for tone detection may be issued from an application such as applications 112/126 without user action. For example, the application may determine that content should be checked for tone because of the nature of the content being created (e.g., an important email). In such a case, the selected text segment may be the entire content or the text segment that the user recently finished creating (e.g., the latest sentence written).

Once a request to provide tone detection has been received, method 500 may proceed to examine the text segment along with user data and/or contextual data to detect the content environment, at 510. For example, method 500 may examine the person to whom the content is directed and the relationship between the user and the receiver to detect the content environment. After the content environment has been detected, method 500 may proceed to examine the content as well as the content environment and other related information to detect the tone of the content, at 515. This may be done by a tone detection engine such as the tone detection engine 114 or local tone detection engine 124 of FIGS. 1A-1C and may involve various steps discussed above with respect to FIGS. 1A-1C. For example, method 500 may first determine if the length of the selected content is appropriate for providing tone detection and if the content is too long, may employ a parsing engine to parse the content into smaller segments for tone detection. In an implementation, an appropriate size for the selected text segment may be one sentence. Examining the content may also include determining if the selected text segment includes an identifiable word. This may include determining if the content includes words, numbers, and/or emoticons. For example, if the content consists of merely symbols (e.g., an equation), an error message may be provided indicating that the selected content segment is not appropriate for providing tone detection. If the request for tone detection originated from the application (e.g., the user did not request the tone detection), the content segment may simply be skipped.

In some implementations, the process of examining additional data include retrieving and examining contextual data and/or user data. This may be done by utilizing one or more text analytics algorithms that may examine the contents, context, formatting and/or other parameters of the document to identify the structure of the sentence containing the content segment, a style associated with the paragraph and/or the document, keywords associated with the document (e.g., the title of the document), the type of content, the type of application, and the like.

The text analytics algorithms may include natural language processing algorithms that allow topic or keyword extractions, for example, in the areas of text classification and topic modeling. Examples of such algorithms include, but are not limited to, term frequency-inverse document frequency (TF-IDF) algorithms and latent Dirichlet allocation (LDA) algorithms. Topic modeling algorithms may examine the document to identify and extract salient words and items within the document that may be recognized as keywords. Keywords may then assist in determining the tone of the content.

The additional information may be provided to one or more ML models for detecting the tone of the selected segment. As discussed above, this may involve calculating a prediction score for each tone and determining if the calculated score meets a threshold associated with the detected environment. When the calculated score meets the threshold requirement, the tone may be identified as being associated with the content. Once one or more tones are detected, method 500 may proceed to enable display of the detected tones and content environment, at 520. This may involve transmitting the detected tone(s) and/or detected content environment to the application for display.

In some implementations, not all detected tones are provided for display. For example, where the request for tone detection is received from the application and not the user, only improper tones may be displayed. To perform this, method 500 may proceed to determine, at 525, whether one or more of the detected tone(s) is an improper tone. This may involve examining the detected content environment, contextual data, user data, documents closely related to or similar to the current document and the like to determine whether a detected tone is improper for the detected content environment.

When it is determined, at 525, that one or more of the detected tones are improper (Yes), method 500 may proceed to provide a notification to the user, at 530. This may involve transmitting an indication to the application which may in turn display a notification to the user (e.g., may display a notification that the detected tone is not recommended and may include the detected in a suggested modifications UI element). When it is determined, however, at 525, that the detected tone(s) are not improper, method 500 may proceed to step 545 to end.

After providing notification of improper tone to the user, at 530, method 500 may proceed to generate and provide suggested rephrases for modifying the tone, at 535. In one implementation, generating suggested rephrases may first involve identifying the portions of the content that are likely responsible for a detected improper tone and the determining how to rephrase those portions. The process of generating suggested rephrases may be achieved by utilizing two or more different types of trained ML models. One type could be a personal model which is trained based on each user's personal information and another could be a global model that is trained based on examination of a global set of other users' information. A hybrid model may be used to examine users similar to the current user and to generate results based on activities of other users having similar characteristics (same organization, having same or similar job titles, creating similar types of documents, and the like) as the current user. For example, it may examine users that create similar artifacts as the current user or create documents having similar topics. As discussed above and further below, any of the models may collect and store what is suggested and record how the user interacts with the suggestions (e.g., which suggestions they approve). This ensures that every time a user interacts with the system, the models learn from the interaction to make the suggestions better. The different models may be made aware of each other, so that they each benefit from what the other models are identifying, while focusing on a specific aspect of the task.

In some implementations, one or more of the models are created by first utilizing machine translation technology to generate a large text segment table (e.g., phrase table), and then using deep neural network techniques to generate the ML models that determine which rewrite alternatives are best in the context. This may be done by first using pre-neural machine translated text segment tables from multiple languages (e.g., 20 languages). In one implementation, heuristic weights for the tables may be replaced with similarity scores, and updated filters may be applied to remove offensive and non-inclusive language, sensitive terms, and/or any private information (e.g., named entities, personal names, etc.). Next, annotation techniques may be used to evaluate usefulness of each candidate replacement text segment for a given original text segment in the table. This process may involve human evaluation of the text segments (e.g., using human judges) and may include thousands of original text segments and hundreds of thousands of candidate replacement text segments. These evaluations may help improve the text segment tables to ensure more appropriate suggestions are provided. The annotations may then be used in ranking metrics to determine how well the model may rank more relevant phrases higher and less relevant phrases lower. Thus, a neural network may be utilized as a language model to contextually rank the replacement text segments provided by the text segment table. Ranking metrics may then be used to reweight for scores provided by the text segment table and the language model.

In some implementations, direct phrase embeddings may also be used to learn a representation of textual segments directly to improve the quality of the models. In one approach, adaptive mixture of word representations may be used instead of averaging, and scores may be optimized on manually annotated textual similarity sets. In another approach, phrase skip-gram models may be trained to predict context words given a text segment. Additionally, representations of a text segment may be computed with neural models such as convolutional or recurrent neural networks. In an example, the replacement text segments may be generated by a machine translation model that is a neural network. This may be in the form of a sequence-to-sequence mapping model, using a long short-term memory model, a transformer model, or any other neural model that is appropriate to the task. The training data may be compiled from naturally-occurring paraphrases, hand-authored rewrites for tone, before and after editing data, paraphrases generated by round-tripping translations, and any other means of synthesizing texts in which semantic equivalence is preserved. Training data may be selected for tone. The neural model may use various forms of multi-task and transfer learning from non-parallel data to achieve the desired characteristics of the rephrased text.

One or more of these models may be used to generate one or more rephrase suggestions for a given text segment, before method 500 enables display of the identified suggestions, at 540. Enabling the display may include transmitting the identified suggestions to the local application running on the user's client device which may utilize one or more UI elements such as those discussed above to display the rephrase suggestions on a display device associated with the client device. The format in which the suggestions are displayed may vary. However, in most cases, the suggestions may be displayed alongside the content to enable easy reference to the content. Once the suggestions are displayed, method 500 may proceed to end at 545.

Figure 6:
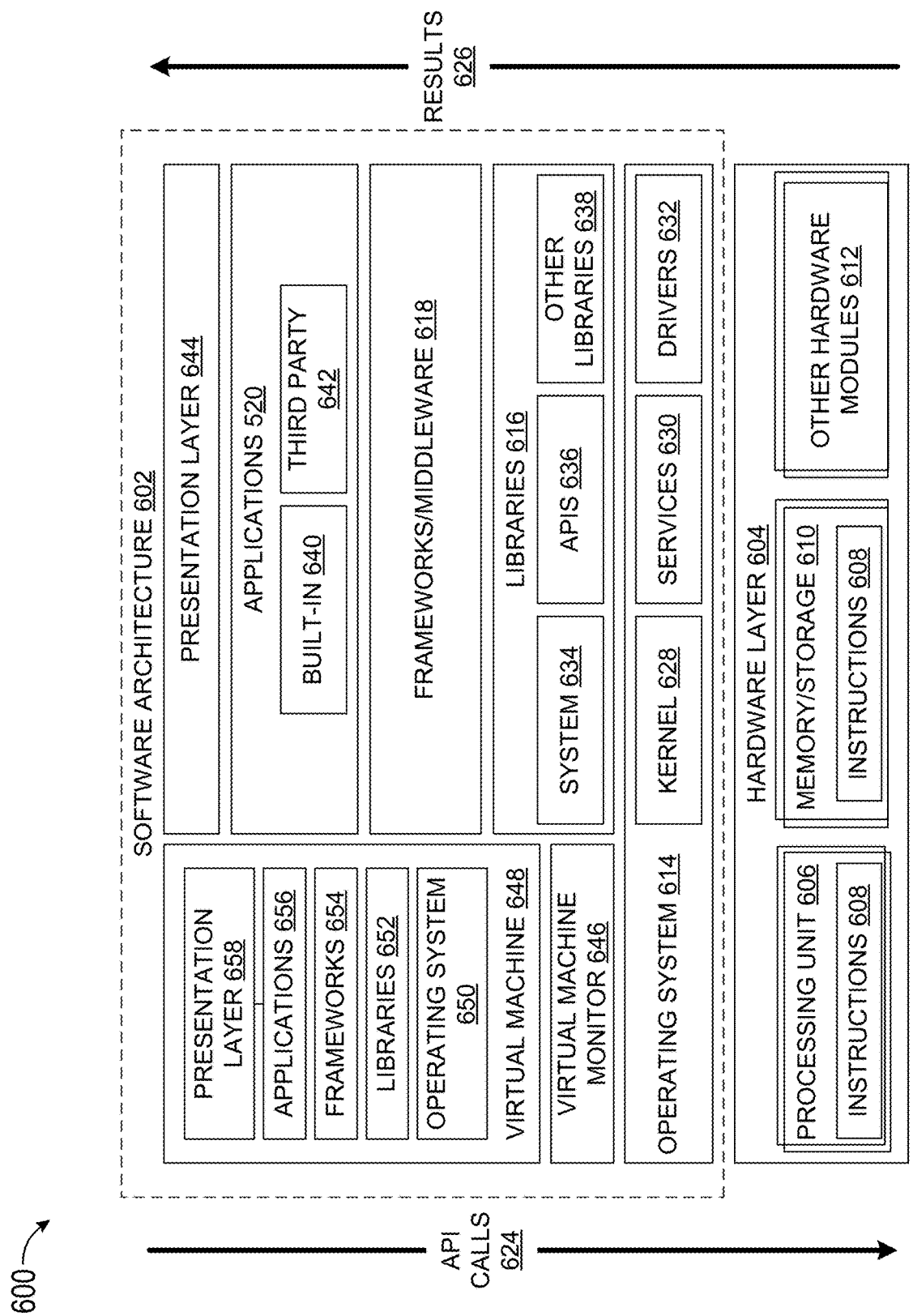
FIG. 6 is a block diagram illustrating an example software architecture, various portions of which may be used in conjunction with various hardware architectures herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture and it will be appreciated that many other architectures may be implemented to facilitate the functionality described herein. The software architecture 602 may execute on hardware such as client devices, native application provider, web servers, server clusters, external services, and other servers. A representative hardware layer 604 includes a processing unit 606 and associated executable instructions 608. The executable instructions 608 represent executable instructions of the software architecture 602, including implementation of the methods, modules and so forth described herein.

The hardware layer 604 also includes a memory/storage 610, which also includes the executable instructions 608 and accompanying data. The hardware layer 604 may also include other hardware modules 612. Instructions 608 held by processing unit 608 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 624. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 620 and/or third-party applications 622. Examples of built-in applications 620 may include, but are not limited to, a contacts application, a browser application, a location application, a media application, a messaging application, and/or a game application. Third-party applications 622 may include any applications developed by an entity other than the vendor of the particular system. The applications 620 may use functions available via OS 614, libraries 616, frameworks 618, and presentation layer 624 to create user interfaces to interact with users.

Some software architectures use virtual machines, as illustrated by a virtual machine 628. The virtual machine 628 provides an execution environment where applications/modules can execute as if they were executing on a hardware machine (such as the machine 600 of FIG. 6, for example). The virtual machine 628 may be hosted by a host OS (for example, OS 614) or hypervisor, and may have a virtual machine monitor 626 which manages operation of the virtual machine 628 and interoperation with the host operating system. A software architecture, which may be different from software architecture 602 outside of the virtual machine, executes within the virtual machine 628 such as an OS 650, libraries 652, frameworks 654, applications 656, and/or a presentation layer 658.

Figure 7:
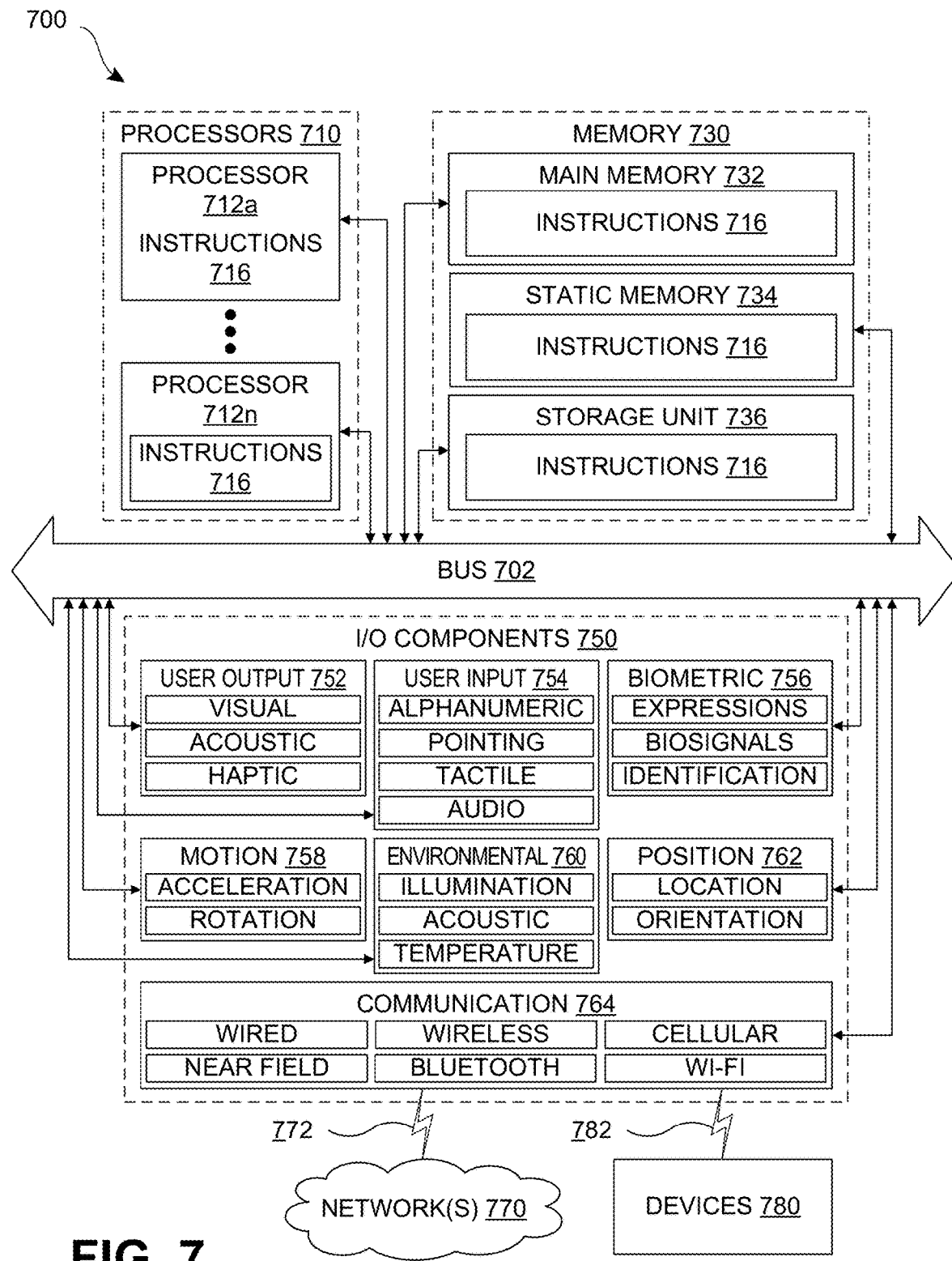
FIG. 7 is a block diagram illustrating components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement methods or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 762 may include, for example, location sensors (for example, a Global Position System (GPS) receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP)

address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-5) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
a processor; and
a memory in communication with the processor, the memory comprising executable instructions that, when executed by the processor, cause the data processing system to perform functions of:
receiving a request to detect a tone for a content;
retrieving user data and data about the content;
detecting a content environment for the content based on at least one of the user data and the data about the content;
detecting the tone for the content based on the content and the content environment;
inputting the content and the detected tone into a machine-learning (ML) model for modifying the tone from the detected tone to a modified tone;
obtaining at least one rephrased content segment as an output from the ML model, the rephrased content segment modifying the tone of the content from the detected tone to the modified tone; and
providing at least one of the detected tone or the at least one rephrased content segment for display.

Item 2. The data processing system of item 1, wherein the instructions further cause the processor to cause the data processing system to perform functions of:
identify a portion of the content that is likely responsible for the detected tone; and
providing display data about the identified portion for display.

Item 3. The data processing system of item 2, wherein the identified portion is identified in a user interface screen as the portion responsible for the detected tone.

Item 4. The data processing system of item 3, wherein upon selection of the identified portion in the user interface screen, the at least one rephrased content segment is displayed.

Item 5. The data processing system of any preceding item, wherein the instructions further cause the processor to cause the data processing system to perform functions of providing the detected content environment for display.

Item 6. The data processing system of any preceding item, wherein the detected content environment includes a detected audience for the content.

Item 7. The data processing system of any preceding item, wherein detecting the tone is done via a plurality of ML models for each of a plurality of tones.

Item 8. The data processing system of item 7, wherein at least one of the plurality of ML models detects the tone by:
calculating a prediction score for a likelihood of the content being associated with the tone;
comparing the calculated prediction score to a threshold requirement for the detected environment; and
when the calculated prediction score meets the threshold requirement for the detected environment, identifying the tone as the detected tone for the content.

Item 9. A method for providing tone detection for a content, comprising:
receiving a request to detect a tone for the content;
retrieving user data and data about the content;
detecting a content environment for the content based on at least one of the user data and the data about the content;
detecting the tone for the content based on the content and the content environment;
inputting the content and the detected tone into a machine-learning (ML) model for modifying the tone from the detected tone to a modified tone;
obtaining at least one rephrased content segment as an output from the ML model, the rephrased content segment modifying the tone of the content from the detected tone to the modified tone; and
providing at least one of the detected tone or the at least one rephrased content segment for display.

Item 10. The method of item 9, further comprising:
parsing the content into a plurality of smaller segments;
detecting a separate tone for one or more of the smaller segments;
determining the tone for the content based on the separate tones for the one or more smaller segments.

Item 11. The method of items 9 or 10, further comprising:
collecting user feedback information relating to at least one of the detected tone or a user's selection of the rephrased content segment;
ensuring that the user feedback information is privacy compliant; and storing the user feedback information for use in improving the ML model.

Item 12. The method of any of items 9-11, further comprising:
identify a portion of the content that is likely responsible for the detected tone; and
providing display data about the identified portion for display.

Item 13. The method of any of items 9-12, further comprising:
determining if the detected tone conveys an improper tone; and
upon determining that the detected tone conveys an improper tone, providing a notification of the improper tone for display.

Item 14. The method of item 13, wherein the identified portion is identified in a user interface screen as the portion responsible for the detected tone.

Item 15. The method of item 14, wherein upon selection of the identified portion in the user interface screen, the at least one rephrased content segment is displayed.

Item 16. The method of any of items 9-15, further comprising providing the detected content environment for display.

Item 17. A non-transitory computer readable medium on which are stored instructions that, when executed, cause a programmable device to perform functions of:
receiving a request to detect a tone for a content;
retrieving user data and data about the content;
detecting a content environment for the content based on at least one of the user data and the data about the content;
detecting the tone for the content based on the content and the content environment;
inputting the content and the detected tone into a machine-learning (ML) model for modifying the tone from the detected tone to a modified tone;
obtaining at least one rephrased content segment as an output from the ML model, the rephrased content segment modifying the tone of the content from the detected tone to the modified tone; and
providing at least one of the detected tone or the at least one rephrased content segment for display.

Item 18. The non-transitory computer readable medium of item 17, wherein the instructions further cause the programmable device to perform functions of:
identify a portion of the content that is likely responsible for the detected tone; and
providing display data about the identified portion for display.

Item 19. The non-transitory computer readable medium of any of items 17 or 18, wherein the identified portion is identified in a user interface screen as the portion responsible for the detected tone.

Item 20. The non-transitory computer readable medium of any of items 17-19, wherein the instructions further cause the programmable device to perform functions of providing the detected content environment for display.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a memory in communication with the processor, the memory comprising executable instructions that, when executed by, the processor, cause the data processing system to perform functions of:
receiving a request to detect a tone for a content;
retrieving user data and data about the content;

detecting a content environment for the content based on at least one of the user data and the data about the content;
calculating a prediction score for a likelihood of the content being associated with a given tone;
comparing the calculated prediction score to a threshold requirement for the detected content environment;
when the calculated prediction score meets the threshold requirement for the detected content environment, identifying the given tone as a detected tone for the content;
inputting the content and the detected tone into a machine-learning (ML) model for modifying the tone from the detected tone to a modified tone;
obtaining at least one rephrased content segment as an output from the ML model, the rephrased content segment modifying the tone of the content from the detected tone to the modified tone; and
providing at least one of the detected tone or the at least one rephrased content segment for display.

2. The data processing system of claim 1, wherein the instructions further cause the processor to cause the data processing system to perform functions of:
identify a portion of the content that is likely responsible for the detected tone; and
providing display data about the identified portion for display.

3. The data processing system of claim 2, wherein the identified portion is identified in a user interface screen as the portion responsible for the detected tone.

4. The data processing system of claim 3, wherein upon selection of the identified portion in the user interface screen, the at least one rephrased content segment is displayed.

5. The data processing system of claim 1, wherein the instructions further cause the processor to cause the data processing system to perform functions of providing the detected content environment for display.

6. The data processing system of claim 1, wherein the detected content environment includes a detected audience for the content.

7. The data processing system of claim 1, wherein detecting the tone is done via a plurality of ML models for each of a plurality of tones.

8. A method for providing tone detection for a content, comprising:
receiving a request to detect a tone for the content;
retrieving user data and data about the content;
detecting a content environment for the content based on at least one of the user data and the data about the content;
calculating a prediction score for a likelihood of the content being associated with a given tone;
comparing the calculated prediction score to a threshold requirement for the detected content environment;
when the calculated prediction score meets the threshold requirement for the detected content environment, identifying the given tone as a detected tone for the content;
inputting the content and the detected tone into a machine-learning (ML) model for modifying the tone from the detected tone to a modified tone;
obtaining at least one rephrased content segment as an output from the ML model, the rephrased content segment modifying the tone of the content from the detected tone to the modified tone; and
providing at least one of the detected tone or the at least one rephrased content segment for display.

9. The method of claim 8, further comprising:
parsing the content into a plurality of smaller segments;
detecting a separate tone for one or more of the smaller segments;
determining the tone for the content based on the separate tone for the one or more smaller segments.

10. The method of claim 8, further comprising:
collecting user feedback information relating to at least one of the detected tone or a user's selection of the rephrased content segment;
ensuring that the user feedback information is privacy compliant; and
storing the user feedback information for use in improving the ML model.

11. The method of claim 8, further comprising:
identify a portion of the content that is likely responsible for the detected tone; and
providing display data about the identified portion for display.

12. The method of claim 8, further comprising:
determining if the detected tone conveys an improper tone; and
upon determining that the detected tone conveys the improper tone, providing a notification of the improper tone for display.

13. The method of claim 11, wherein the identified portion is identified in a user interface screen as the portion responsible for the detected tone.

14. The method of claim 13, wherein upon selection of the identified portion in the user interface screen, the at least one rephrased content segment is displayed.

15. The method of claim 8, further comprising providing the detected content environment for display.

16. A non-transitory computer readable medium on which are stored instructions that, when executed, cause a programmable device to perform functions of:
receiving a request to detect a tone for a content;
retrieving user data and data about the content;
detecting a content environment for the content based on at least one of the user data and the data about the content;
calculating a prediction score for a likelihood of the content being associated with a given tone;
comparing the calculated prediction score to a threshold requirement for the detected content environment;
when the calculated prediction score meets the threshold requirement for the detected content environment, identifying the given tone as a detected tone for the content;
inputting the content and the detected tone into a machine-learning (ML) model for modifying the tone from the detected tone to a modified tone;
obtaining at least one rephrased content segment as an output from the ML model, the rephrased content segment modifying the tone of the content from the detected tone to the modified tone; and
providing at least one of the detected tone or the at least one rephrased content segment for display.

17. The non-transitory computer readable medium of claim 16, wherein the instructions further cause the programmable device to perform functions of:
identify a portion of the content that is likely responsible for the detected tone; and
providing display data about the identified portion for display.

18. The non-transitory computer readable medium of claim 17, wherein the identified portion is identified in a user interface screen as the portion responsible for the detected tone.

19. The non-transitory computer readable medium of claim 16, wherein the instructions further cause the programmable device to perform functions of providing the detected content environment for display.

* * * * *